United States Patent
Uchida et al.

(10) Patent No.: US 9,656,595 B2
(45) Date of Patent: May 23, 2017

(54) SYSTEM, DEVICE AND METHOD FOR CONTROLLING VEHICLE LIGHT

(71) Applicant: DENSO CORPORATION, Kariya, Aichi-pref. (JP)

(72) Inventors: Yuki Uchida, Aichi-ken (JP); Ryu Mizuno, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/773,267

(22) PCT Filed: Mar. 6, 2014

(86) PCT No.: PCT/JP2014/055803
§ 371 (c)(1),
(2) Date: Sep. 4, 2015

(87) PCT Pub. No.: WO2014/136887
PCT Pub. Date: Sep. 12, 2014

(65) Prior Publication Data
US 2016/0001696 A1 Jan. 7, 2016

(30) Foreign Application Priority Data
Mar. 6, 2013 (JP) .................. 2013-044453

(51) Int. Cl.
*B60Q 1/14* (2006.01)
(52) U.S. Cl.
CPC ........... *B60Q 1/1423* (2013.01); *B60Q 1/143* (2013.01); *B60Q 2300/112* (2013.01);
(Continued)

(58) Field of Classification Search
CPC ........ B60Q 2300/122; B60Q 2300/112; B60Q 1/12; B60Q 2300/322
See application file for complete search history.

(56) References Cited

U.S. PATENT DOCUMENTS

2001/0012206 A1   8/2001   Hayami et al.
2001/0028565 A1   10/2001  Ishida
(Continued)

FOREIGN PATENT DOCUMENTS

JP   UH05-26629      4/1993
JP   H11235948 A     8/1999
(Continued)

OTHER PUBLICATIONS

International Preliminary Report on Patentability; International Application No. PCT/JP2014/055803; Filed: Mar. 6, 2013 (with English translation).
(Continued)

*Primary Examiner* — Jany Richardson
(74) *Attorney, Agent, or Firm* — Knobbe, Martens, Olson & Bear, LLP

(57) ABSTRACT

A light control system is provided. In the system, an processor sets a maximum light quantity of a lighting device according to the curvature radius of the road the own vehicle travels. The processor then controls the light quantity of the lighting device so as to be equal to or less than the maximum light quantity. According to the system, a maximum light quantity of the lighting device is set according to a curvature radius. Accordingly, a light quantity is appropriately set so as not to dazzle the driver of another vehicle.

20 Claims, 3 Drawing Sheets

(52) U.S. Cl.
CPC .. *B60Q 2300/122* (2013.01); *B60Q 2300/134* (2013.01); *B60Q 2300/322* (2013.01)

(56) References Cited

U.S. PATENT DOCUMENTS

| | | |
|---|---|---|
| 2005/0117358 A1* | 6/2005 | Fukawa .................. B60Q 1/12 362/460 |
| 2005/0134483 A1 | 6/2005 | Monji et al. |
| 2009/0231867 A1 | 9/2009 | Mochizuki et al. |
| 2012/0146506 A1 | 6/2012 | Nakano et al. |

FOREIGN PATENT DOCUMENTS

| | | |
|---|---|---|
| JP | 2005-170063 A | 6/2005 |
| JP | 2005255049 A | 9/2005 |
| JP | 2006-096158 A | 4/2006 |
| JP | 2007-045252 A | 2/2007 |
| JP | 2009-214812 A | 9/2009 |
| JP | 2012-121521 A | 6/2012 |
| JP | 2013-154745 A | 8/2013 |
| WO | 2014/136887 A1 | 9/2014 |

OTHER PUBLICATIONS

International Search Report (translated version); International Application No. PCT/JP2014/055803, filed Mar. 6, 2014; 10 pages.

\* cited by examiner

SYSTEM, DEVICE AND METHOD FOR CONTROLLING VEHICLE LIGHT

CROSS-REFERENCE TO RELATED APPLICATION

This application is based on and claims the benefit of priority from earlier Japanese Patent Application No. 2013-044453 filed Mar. 6, 2013, the description of which is incorporated herein by reference.

BACKGROUND

Technical Field

The present invention relates to a system installed in a vehicle to control a lighting device that radiates light in a traveling direction of the vehicle, and relates to a device and a method for the system.

Background Art

As a light control device of this type, the configuration described such as in PTL 1 is known. The light control device described in PTL 1 includes an auxiliary light that illuminates light in a direction in which the vehicle makes a turn. The auxiliary light is configured to be turned on or off according to the steering angle.

CITATION LIST

Patent Literature

[PTL 1]JP-A-2007-045252

Technical Problem

However, in the light control device mentioned above, the light quantity of the auxiliary light is constant and therefore the driver of another vehicle, such as an oncoming vehicle, may be dazzled. Such a situation should be avoided.

SUMMARY

Therefore, it is desired that another vehicle's driver is reliably prevented from being dazzled, in controlling the lighting device that radiates light in a traveling direction of the vehicle.

As a typical aspect, a light control device is provided. The light control device is mounted to a vehicle and controls light radiation conditions for a lighting device that radiates light in a traveling direction of the vehicle. Specifically, the light control device includes a maximum light quantity setting means setting a maximum light quantity of the lighting device according to a curvature radius of a road the vehicle travels; and a light quantity control means controlling a light quantity of the lighting device so as to be equal to or less than the maximum light quantity.

Thus, according to the light control device, a maximum light quantity is set according to a curvature radius. Accordingly, an appropriate light quantity can be set so as not to dazzle the driver of another vehicle.

The individual means that configure the light control device can be functionally realized by a computer that operates according to a preset control program or the like.

On the other hand, according to another typical aspect, a light control system is provided. The system includes a lighting device that is mounted to a vehicle so as to radiate light in a travelling direction of the vehicle, and is able to adjust a quantity of the radiated light; a detecting means detecting information that indicates a curvature radius of a road the vehicle travels; and a light control device that controls a quantity of radiated light of the lighting device. The light control device includes: a maximum light quantity setting means setting a maximum light quantity of the lighting device according the curvature radius of the road which is indicated by information that is detected by the detecting means; and a light quantity control means controlling a light quantity of the lighting device so as to be equal to or less than the maximum light quantity.

The light control system can also achieve the advantageous effects similar to those of the light control device described above.

Further, a light control method which realizes a process executed by the control system can also be similarly implemented.

DESCRIPTION OF EMBODIMENTS

With reference to the drawings, hereinafter is described an embodiment of the present invention.

A light control system 1 to which the present invention is applied is installed in a vehicle VE. The light control system 1 includes headlights that radiate light in a traveling direction of the vehicle VE to control a light radiation direction of the headlights. In particular, the light control system 1 of the present embodiment has a function of controlling the light quantity of the headlights according to the curvature radius of the road on which the vehicle equipped with the system 1 travels.

Figure 1:
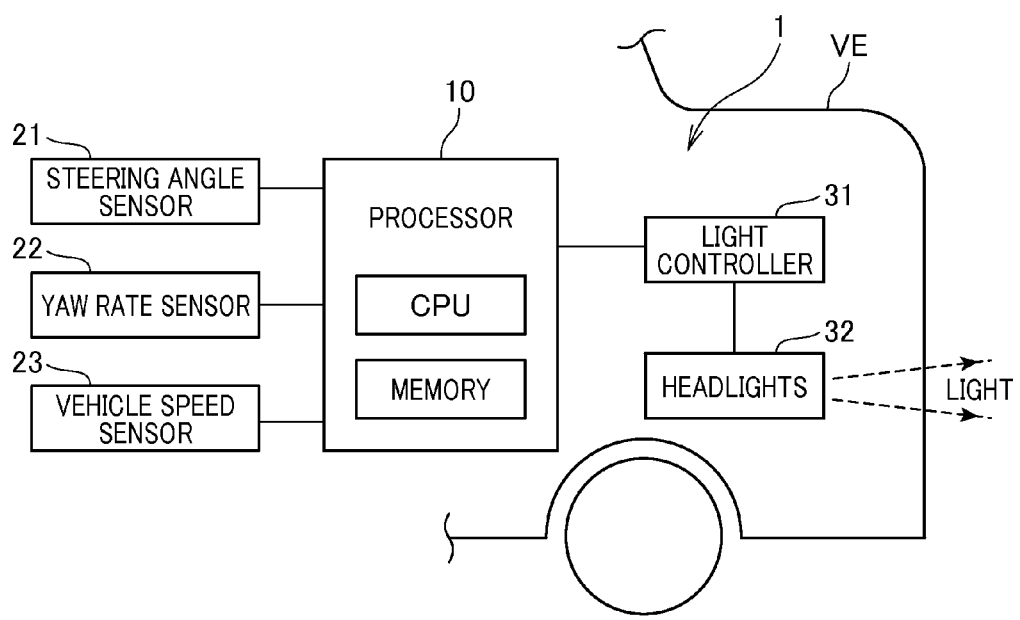
FIG. 1 is a clock diagram illustrating a schematic configuration of a light control system.

More specifically, as shown in FIG. 1, the light control system 1 includes a processor 10, a steering angle sensor 21, a yaw rate sensor 22, a vehicle speed sensor 23, a light controller 31, and headlights 32. The processor 10 functions as a light control device.

The steering angle sensor 21, the yaw rate sensor 22 and the vehicle speed sensor 23 are each configured as a known sensor. Specifically, the steering angle sensor 21 detects a steering angle of the vehicle EV and transmits the detected steering angle to the processor 10. The steering angle sensor 21 is required to be configured such that the processor 10 is able to grasp the direction, i.e. right or left, in which the vehicle VE is making a turn. To this end, for example, the steering angle sensor 21 outputs a steering angle, as a steering angle signal, at the time of right turn as a plus value, and also outputs a steering angle signal at the time of left turn as a minus value.

The yaw rate sensor 22 detects a turning angular speed of the vehicle VE and transmits the detected turning angular speed to the processor 10. The vehicle speed sensor 23 detects a traveling speed of the vehicle VE and transmits the detected traveling speed to the processor 10.

The light controller 31 produces an output for activating the headlights 32, according to the light distribution (direction of the optical axis, radiation range, etc.) of the headlights 32 and the light quantity of the headlights 32 instructed from the processor 10. The headlights 32 emit light according to the output of the light controller 31 to realize light emission with a desired light quantity. Further, according to the output from the light controller 31, actuators (not shown), such as a motor, are activated to realize a desired light distribution.

The processor 10 is configured as a computer that includes a CPU (central processing unit) 11, and a memory 12, such as a ROM (read only memory) or a RAM (random access memory). The CPU 11 executes various processes, such as a light quantity control process, described later, as cyclical interrupt processes.

The following description sets forth a light quantity control process performed by the light control system 1 configured as described above. In the light quantity control process, the curvature radius of the road is calculated on the basis of the detection results of the sensors 21 to 23, and the light quantity of the headlights 32 is controlled according to the curvature radius.

Figure 2:
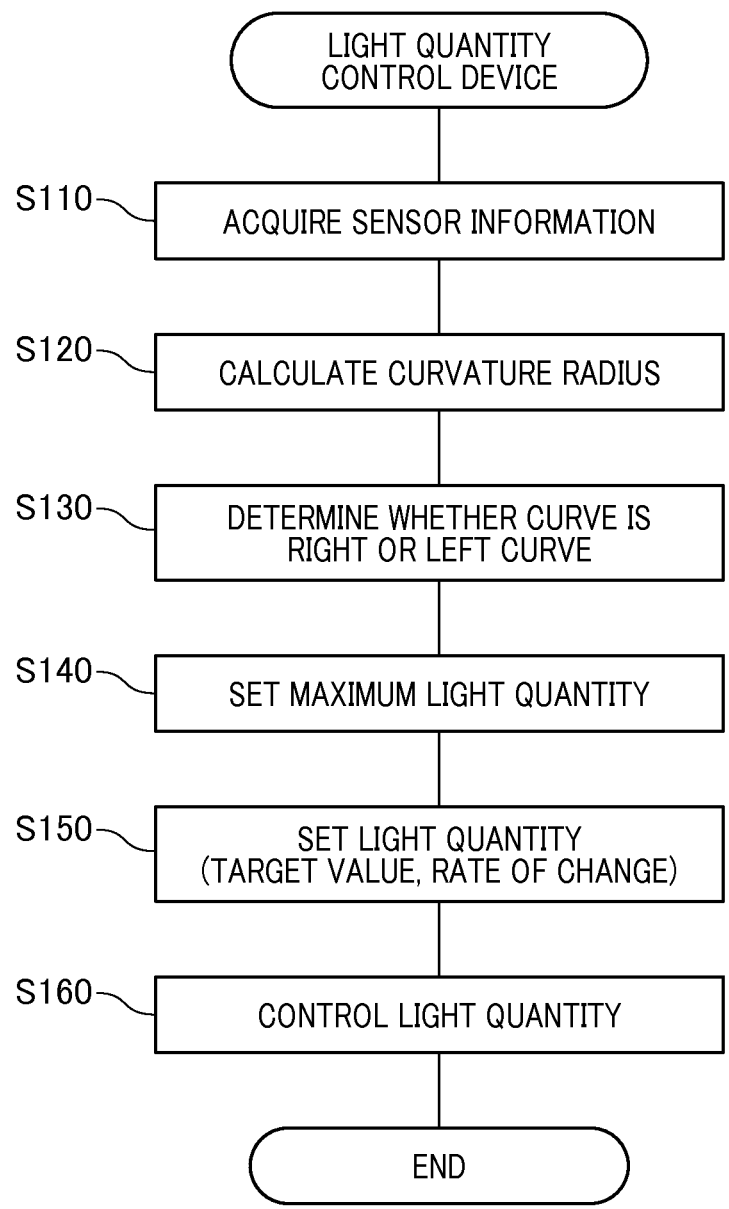
FIG. 2 is a flow chart illustrating a light quantity control process executed by a processor (CPU) incorporated in the system.

Specifically, as shown in FIG. 2, sensor information is acquired first (S110). At this step, the light control system 1 acquires the detection results (sensor values) from the steering angle sensor 21, the yaw rate sensor 22, and the vehicle speed sensor 23.

Subsequently, the curvature radius of the road on which the vehicle travels is calculated (S120). At this step, the light control system 1 calculates the curvature radius of the road on the basis of the traveling speed, the steering angle, and the yaw rate of the vehicle.

Then, the curve direction, i.e. right or left, of the road on which the vehicle travels is determined (S130). At this step, the light control system 1 can determine the curve direction on the basis of whether the output of the angle sensor 21 is a plus value or a minus value.

Figure 3:
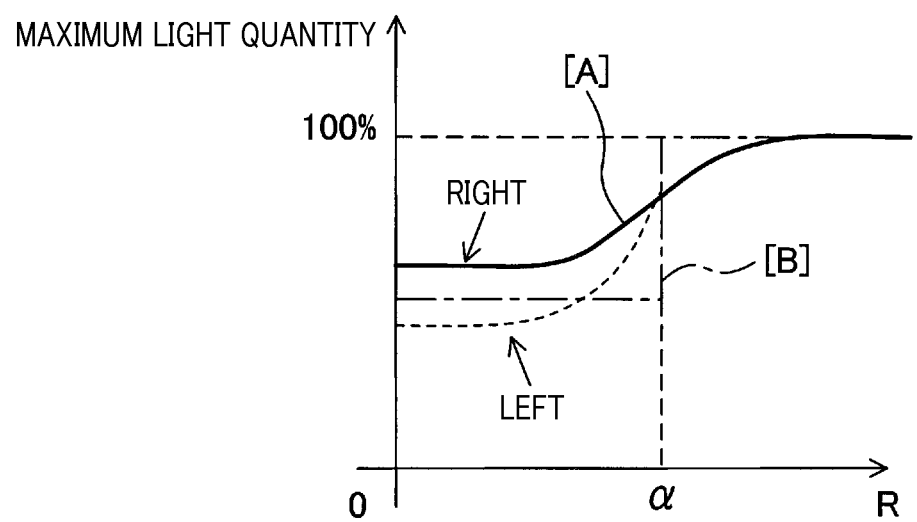
FIG. 3 is a graph illustrating a relationship between a curvature radius and a maximum light quantity.

Subsequently, a maximum light quantity is set (S140). At this step, as indicated by the solid line [A] of FIG. 3, the maximum light quantity is set so as to gradually become smaller (lower), as a curvature radius R becomes smaller. The maximum light quantity is set, depending on the curve direction, i.e. right or left, of the road. When the road is curved to the left, a smaller maximum light quantity is set (see the dashed line of FIG. 3) than when curved to the right (solid line [A]).

The reason why a smaller maximum light quantity is set when the road is curved to the left than when curved to the right is that, in Japan, an oncoming vehicle travels past the front of the own vehicle VE when the road is curved to the left and, during the passage, the driver of the oncoming vehicle may be dazzled.

Subsequently, the light quantity of the headlights 32 is set (S150). At this step, the light control system 1 sets a target value which is set within a set maximum light quantity, and a rate of change of light quantity for allowing the light quantity to conform to the target value. The description herein is given taking that the target value coincides with the maximum light quantity. The target value only has to be set within the maximum light quantity. Thus, for example, the target value may be changed according the travelling speed or the like of the own vehicle.

Figure 4:
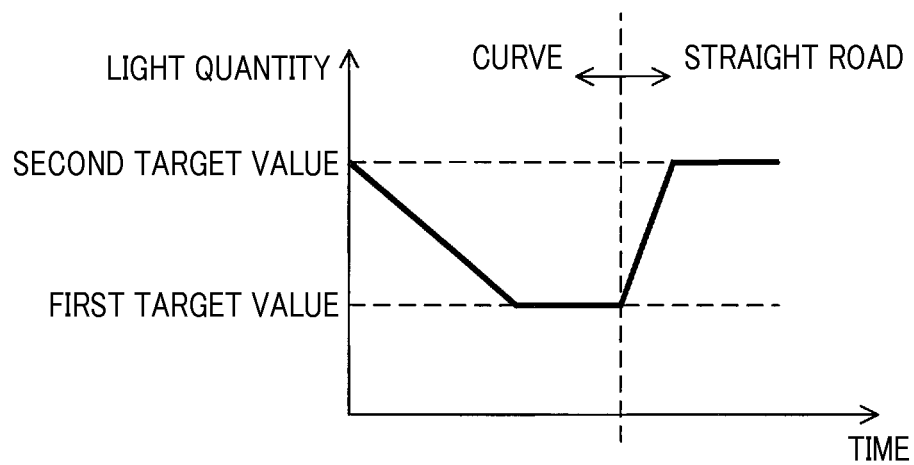
FIG. 4 is a graph illustrating a relationship between time and a light quantity.

Specifically, as shown in FIG. 4, when the vehicle enters a curved road from a straight road and the light quantity is decreased from a second target value to a first target value (light decrease), the rate of change of light quantity is retained to be constant. Then, when the road again turns to a straight road and the light quantity is increased from the first target value to the second target value (light increase), the rate of change of the light quantity is also retained to be constant.

However, the light quantity at the time of light decrease is set with a more moderate rate of change, than at the time of light increase. The reason why such a setting is made is that more time is taken for light adaptation than for dark adaptation, and that this setting is able to suppress the occupant's uneasiness that would be felt in drastic light decrease.

Subsequently, the light control system 1 outputs an instruction for controlling the light quantity in conformity with the set target and rate of change (S160) and then terminates the light quantity control process.

Advantageous Effects of the Present Embodiment

In the light control system 1 described above in detail, the processor 10 sets a maximum light quantity according to the curvature radius of the road the vehicle travels. Then, the processor 10 controls the light quantity so as to be equal to or less than the maximum light quantity.

According to the light control system 1 configured in this way, a maximum light quantity is set according to the curvature radius.

Thus, the light quantity can be appropriately set so as not to dazzle the driver of another vehicle.

Further, the processor 10 of the light control system 1 sets a smaller maximum light quantity, as the curvature radius of the road becomes smaller.

According to the light control system 1 configured in this way, a small maximum light quantity is set when there is a high probability of dazzling the driver of another vehicle, such as when the vehicle is making a turn. Thus, it is ensured that the driver of another vehicle is unlikely to be dazzled. In general, the speed of a vehicle is reduced when the vehicle makes a turn on a road having a small curvature radius. In this case, since it is not necessary to radiate light so far, safety can also be easily ensured.

Further, the processor 10 of the light control system 1 sets a maximum light quantity, depending on the curve direction, i.e. right or left, of the road. In particular, when the vehicle makes a turn during which an oncoming vehicle may travel past the front of the vehicle (left turn in a region, such as Japan, where vehicles run keeping to the left side of the road), a smaller maximum light quantity is set.

According to the light control system 1 configured in this way, the driver of another vehicle is more unlikely to be dazzled. In the light control system 1, the processor 10 makes the rate of change more moderate when the light quantity is decreased than when increased.

According to the light control system 1 configured in this way, the occupant is unlikely to feel uneasiness at the time of light decrease.

[Other Embodiments]

The present invention should not be construed as being limited to the foregoing embodiment. The present invention should encompass any mode in which the configuration of the foregoing embodiment is partially omitted to an extent that the partially omitted configuration can solve the above problem. The present invention should encompass any mode configured by appropriately combining the above plurality of embodiments. The present invention should encompass any mode that can be conceived within a range of not departing from the essentials of the invention which are defined by only the wordings presented in the claims. The reference signs used in the foregoing embodiment are used in the claims as appropriate. However, the reference signs in the claims are used for easier understanding of the present invention and are not intended to limit the technical scope of the subject matters of the claims.

For example, in the foregoing embodiment, the light quantity is set so as to become gradually smaller, as the curvature radius becomes smaller. Alternatively, the maximum light quantity may be set stepwise, depending on whether the curvature radius exceeds a threshold (α in FIG. 3) (see the dash-dot line [B] of FIG. 3). In other words, the maximum light quantity may be set, depending on whether the road is a curved road or straight road.

It should be noted that the processor 10 in the foregoing embodiment corresponds to the light control device. Accordingly, the processor 10 is the main component implementing the light control method. In the light quantity process of the foregoing embodiment, the step of S140 corresponds to the maximum light quantity setting means, and the steps of S150 and S160 correspond to the light quantity control means.

REFERENCE SIGNS LIST

1 . . . Light control system, 10 . . . Processor, 11 . . . CPU, 12 . . . Memory, 21 . . . Steering angle sensor, 22 . . . Yaw rate sensor, 23 . . . Vehicle speed sensor, 31 . . . Light controller, 32 . . . Headlights

The invention claimed is:

1. A light control device that is mounted to a vehicle and controls light radiation conditions for a lighting device that radiates light in a traveling direction of the vehicle, comprising:
a maximum light quantity setting means setting a maximum light quantity of the lighting device according to a curvature radius of a road the vehicle travels; and
a light quantity control means controlling a light quantity of the lighting device so as to be equal to or less than the maximum light quantity.

2. The light control device according to claim 1, wherein the maximum light quantity setting means sets the maximum light quantity so as to be smaller, as the curvature radius of the road becomes smaller.

3. The light control device according to claim 2, wherein the maximum light quantity setting means sets a maximum light quantity, depending on a curve direction, i.e. right or left, of the road.

4. The light control device according to claim 3, wherein the light control means makes a rate of change of light quantity more moderate in decreasing light quantity than in increasing light quantity.

5. The light control device according to claim 2, wherein the light control means makes a rate of change of light quantity more moderate in decreasing light quantity than in increasing light quantity.

6. The light control device according to claim 1 wherein the maximum light quantity setting means sets a maximum light quantity, depending on a curve direction, i.e. right or left, of the road.

7. The light control device according to claim 6, wherein the maximum light quantity setting means is configured to set a maximum light quantity, depending on a curve direction, i.e. right or left, of the road, and set the maximum light quantity to be smaller, when the vehicle is turning in the curve direction where an oncoming vehicle travels past a front of the vehicle.

8. The light control device according to claim 1, wherein the light control means makes a rate of change of light quantity more moderate in decreasing light quantity than in increasing light quantity.

9. The light control device according to claim 1, wherein the light quantity control means is configured to set a target value of the light quantity which is set within the maximum light quantity, and set a rate of change of the light quantity so as to allow the light quantity to be the target value; and the target value is set depending on a travelling speed of the vehicle.

10. The light control device according to claim 1, wherein the maximum light quantity setting means is configured to set the maximum light quantity stepwise, depending on whether the curvature radius exceeds a predetermined threshold.

11. A light control system comprising:
a lighting device that is mounted to a vehicle so as to radiate light in a travelling direction of the vehicle, and is able to adjust a quantity of the radiated light;
a detecting means detecting information that indicates a curvature radius of a road the vehicle travels; and
a light control device that controls a quantity of radiated light of the lighting device, wherein:
the light control device comprises:
a maximum light quantity setting means setting a maximum light quantity of the lighting device according the curvature radius of the road which is indicated by information that is detected by the detecting means; and
a light quantity control means controlling a light quantity of the lighting device so as to be equal to or less than the maximum light quantity.

12. The light control system according to claim 11, wherein the maximum light quantity setting means sets the maximum light quantity so as to be smaller, as the curvature radius of the road becomes smaller.

13. The light control system according to claim 12, wherein the maximum light quantity setting means sets a maximum light quantity, depending on a curve direction, i.e. right or left, of the road.

14. The light control system according to claim 13, wherein the light quantity control means makes a rate of change of light quantity more moderate in decreasing light quantity than in increasing light quantity.

15. The light control system according to claim 11 wherein the maximum light quantity setting means sets a maximum light quantity, depending on a curve direction, i.e. right or left, of the road.

16. The light control system according to claim 15, wherein the maximum light quantity setting means is configured to set a maximum light quantity, depending on a curve direction, i.e. right or left, of the road, and set the maximum light quantity to be smaller, when the vehicle is turning in the curve direction where an oncoming vehicle travels past a front of the vehicle.

17. The light control system according to claim 11, wherein the light quantity control means makes a rate of change of light quantity more moderate in decreasing light quantity than in increasing light quantity.

18. The light control system according to claim 11, wherein the light quantity control means is configured to set a target value of the light quantity which is set within the maximum light quantity, and set a rate of change of the light quantity so as to allow the light quantity to be the target value; and the target value is set depending on a travelling speed of the vehicle.

19. The light control system according to claim 11, wherein the maximum light quantity setting means is configured to set the maximum light quantity stepwise, depending on whether the curvature radius exceeds a predetermined threshold.

20. A light control method that is installed in a vehicle to radiate light in a traveling direction of the vehicle and controls the light quantity of a lighting device that is able to adjust a quantity of the radiated light, comprising steps of:
- detecting information that indicates a curvature radius of a road the vehicle travels;
- setting a maximum light quantity of the light according to the curvature radius of the road which is indicated by the information; and
- controlling a light quantity of the lighting device so as to be equal to or less than the maximum light quantity.

\* \* \* \* \*